United States Patent
Munoz, Jr. et al.

(10) Patent No.: US 7,211,548 B2
(45) Date of Patent: *May 1, 2007

(54) TREATMENT FLUIDS COMPRISING STARCH AND CERAMIC PARTICULATE BRIDGING AGENTS AND METHODS OF USING THESE FLUIDS TO PROVIDE FLUID LOSS CONTROL

(75) Inventors: Trinidad Munoz, Jr., Duncan, OK (US); Bradley L. Todd, Duncan, OK (US)

(73) Assignee: Halliburton Energy Services, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 11/329,345

(22) Filed: Jan. 10, 2006

(65) Prior Publication Data

US 2006/0111247 A1    May 25, 2006

Related U.S. Application Data

(62) Division of application No. 10/657,988, filed on Sep. 9, 2003, now Pat. No. 7,036,588.

(51) Int. Cl.
  *C09K 8/76*   (2006.01)
  *E21B 43/25*  (2006.01)
  *E21B 43/12*  (2006.01)

(52) U.S. Cl. .................. 507/212; 507/269; 507/935; 166/282; 166/283

(58) Field of Classification Search ............... None
See application file for complete search history.

(56) References Cited

U.S. PATENT DOCUMENTS

| | | | |
|---|---|---|---|
| 3,901,874 A * | 8/1975 | Hill ........................ 536/2 |
| 3,935,187 A * | 1/1976 | Speakman ................ 536/102 |
| 5,000,783 A * | 3/1991 | Dingeman et al. .......... 75/321 |
| 5,504,062 A * | 4/1996 | Johnson ................... 507/212 |
| 5,616,541 A * | 4/1997 | Dobson et al. ............ 507/111 |
| 5,641,728 A | 6/1997 | Dobson, Jr. et al. |
| 5,804,535 A | 9/1998 | Dobson et al. |
| 5,851,959 A | 12/1998 | Bernu |
| 5,977,348 A | 11/1999 | Harris et al. |
| 6,124,244 A | 9/2000 | Murphey |
| 6,300,286 B1 * | 10/2001 | Dobson et al. ............ 507/111 |
| 6,391,830 B1 * | 5/2002 | Dobson et al. ............ 507/111 |
| 6,422,314 B1 | 7/2002 | Todd et al. |
| 6,494,263 B2 | 12/2002 | Todd |
| 6,506,805 B2 * | 1/2003 | Green et al. ................ 516/88 |
| 6,576,597 B2 * | 6/2003 | Dobson et al. ............ 507/111 |
| 2002/0036088 A1 * | 3/2002 | Todd ........................ 166/300 |
| 2004/0014606 A1 | 1/2004 | Parlar et al. |

* cited by examiner

*Primary Examiner*—Randy Gulakowski
*Assistant Examiner*—John J. Figueroa
(74) *Attorney, Agent, or Firm*—Craig W. Roddy; Baker Botts, LLP.

(57) ABSTRACT

Methods and compositions relating to fluid loss control operations are provided. More particularly, fluid loss treatment fluid compositions may comprise ceramic particulate bridging agents, a partially depolymerized starch derivative, and a base fluid. In some embodiments, the partially depolymerized starch derivative may include a crosslinked ether derivative of a partially depolymerized starch, a partially depolymerized crosslinked ether derivative of a starch, or a combination thereof.

18 Claims, No Drawings

TREATMENT FLUIDS COMPRISING STARCH AND CERAMIC PARTICULATE BRIDGING AGENTS AND METHODS OF USING THESE FLUIDS TO PROVIDE FLUID LOSS CONTROL

CROSS-REFERENCE TO RELATED APPLICATION

This application is a divisional patent application of commonly-owned U.S. patent application Ser. No. 10/657,988, filed Sep. 9, 2003 now U.S. Pat. No. 7,036,588, entitled "Treatment Fluids Comprising Starch and Ceramic Particulate Bridging Agents and Methods of Using These Fluids to Provide Fluid Loss Control," by Trinidad Munez, Jr., et al., which is incorporated by reference herein for all purposes.

BACKGROUND OF THE INVENTION

The present invention relates to fluid loss control operations. More particularly, the present invention provides compositions comprising ceramic particulate bridging agents and improved fluid loss control additives, and methods of using those compositions to provide fluid loss control.

Drilling and servicing fluids, inter alia, deposit filter cake on the walls of well bores within the producing formations to substantially prevent drilling, servicing, and completion fluids from being lost into the formation and solids from entering into the porosities of the formation. After the drilling or servicing operation has been completed, the filter cake is removed prior to placing the formation on production. Removal of the filter cake heretofore has been accomplished by including a water, oil, or acid soluble particulate solid bridging agent in the treatment fluid for bridging over the formation pores or other opening. Such areas include formation pore throats, gravel packs, sand screens, or fractures in the formation as well as openings such as cracks in tubing or casing, holes in sand screens, or on other perforations downhole such as in a shroud, casing, or other tubing. By bridging across such areas, the bridging agents combined with a fluid loss control additive form a substantially impermeable "filter cake" on that area that prevents loss of treatment fluids to the surrounding formation.

Common bridging agents include calcium carbonate, suspended salts, or oil-soluble reins. For lost-circulation treatments outside the production interval, any suitably sized product may be used, including mica, nutshells, and fibers. The selection of an appropriate bridging material is more critical in the production interval and during work-over operations since the barrier should be completely removed in preparation for placing the well back into production. As an alternative to conventional bridging agents, chemically bonded ceramic particulates are desirable because they are customizable as these particulates are made via a process similar to that of mixing a cementitious material. As a result, their composition, and properties can be varied, and they can be impregnated with desirable additives. Another advantageous feature of these particular bridging agents is that they are soluble in ammonium salts and chelating agents.

Starches are often used in conjunction with bridging agents, inter alia, to aid in the prevention of fluid loss to the formation. Starches are carbohydrates of a general formula $(C_6H_{10}O_5)_n$, and are derived from corn, wheat, oats, rice, potatoes, yucca, and the like. Most starches usually comprise about 27% linear polymer (amylose) and about 73% branched polymer (amylopectin). These two polymers are intertwined within starch granules. Granules generally are insoluble in cold water, but soaking in hot water or under steam pressure ruptures their covering and the polymers hydrate into a colloidal suspension. Amylose and amylopectin are nonionic polymers that do not interact with electrolytes. Derivatized starches, such as hydroxy propyl and carboxylmethyl starches are used in drill-in fluids, completion fluids, and various brine systems as well as in drilling fluid systems.

Problems arise, however, when conventional starches are added to fluids comprising chemically bonded ceramic particulates. When combined, the fluid gels to a point where it ultimately has the consistency of paste. As a result, this combination is unusable in downhole applications. This is unfortunate because the starch provides an added means to ensure fluid loss control in a process using the desirable chemically bonded ceramic particulates.

SUMMARY OF THE INVENTION

The present invention relates to fluid loss control operations. More particularly, the present invention provides compositions comprising ceramic particulate bridging agents and improved fluid loss control additives, and methods of using those compositions to provide fluid loss control.

An embodiment of the fluid loss treatment fluids of the present invention comprises ceramic particulate bridging agents, a partially depolymerized starch derivative, and a base fluid.

The objects, features and advantages of the present invention will be readily apparent to those skilled in the art upon a reading of the description of the preferred embodiments that follows.

DESCRIPTION OF PREFERRED EMBODIMENTS

The present invention relates to fluid loss control operations. More particularly, the present invention provides compositions comprising ceramic particulate bridging agents and improved fluid loss control additives, and methods of using those compositions to provide fluid loss control. Even more particularly, the present invention provides improved treatment fluids, including drilling as well as servicing fluids that comprise ceramic particulate bridging agents and a modified starch composition to deposit filter cakes that can readily be removed without the use of strong acids or other hazardous chemicals that may create problems on the well site, e.g., equipment corrosion. The treatment fluids of the present invention may be formulated to bridge on any desired opening where it is desirable to control fluid loss. In subterranean applications this may include any opening within a wellbore penetrating a subterranean formation such as a gravel pack, a screen, a perforated shroud, a portion of the subterranean formation, or any other opening such as a crack in the casing or other tubing within the hole.

The treatment fluids of the present invention comprise ceramic particulate bridging agents, a modified starch fluid loss additive, and a base fluid. The combination of the modified starches and the ceramic bridging agents of the present invention provides a beneficial means to control fluid loss where desirable. Heretofore known combinations of conventional starches and ceramic bridging agents have resulted in unusable compositions. Optionally, the treatment fluids of the present invention may comprise a viscosifier. The treatment fluids of the present invention may be used when there is risk of undesirable fluid loss, for example, into the subterranean formation surrounding a well bore. Examples of fluids in which the treatment fluids of the present invention may be used include drilling fluids, drill-in fluids, and fluid loss control pills. Other examples include servicing and completion fluid applications. Optionally, other components such as viscosifiers, salts, surfactants, clay control additives, lubricants, biocides, and the like may be included within the treatment fluid compositions of the present invention. One of ordinary skill in the art with the benefit of this disclosure will recognize when such optional components should be included.

The ceramic particulate bridging agents and modified starches of the present invention act to form a filter cake in the subterranean formation, inter alia, to prevent or eliminate fluid loss from the well bore to the formation. In certain embodiments of the present invention when used in a subterranean application, the ceramic particulate bridging agents and modified starches are deposited by the treatment fluid on the walls of the well bore in the producing zone being drilled or serviced along with other components. These ceramic particulate bridging agents and modified starches may be added to the treatment fluids of the present invention, inter alia, to bridge across any opening for which fluid loss control is desired. In certain embodiments, this may include the pore throats, fractures of an exposed rock, or other undesirable openings extending from the well bore into a formation. The bridging agents in effect plug off fluid paths from one location to another. The bridge may be partial or total. To build a sort of filter cake on those openings, the bridging agents and modified starches may lodge together or otherwise cohesively create a barrier to fluid flow.

The ceramic particulate bridging agents of the present invention are preferably chemically bonded particulates. Such chemically bonded particulates are preferred because they have an inherent flexibility in their composition, properties, and in their ability to act as carriers for desirable additives such as breakers. Any ceramic particulate bridging agent that is compatible with the conditions of the proposed application is suitable for use in conjunction with the present invention. In certain preferred embodiments, the particulate bridging agents used in the compositions and methods of the present invention comprise inorganic compounds that are substantially insoluble in water, but which are substantially soluble, for example, in aqueous ammonium salt clean-up solutions. One example of such suitable magnesium-based ceramic particulate bridging agents include compounds illustrated by this formula: $MgO + KH_2PO_4 + 5H_2O \rightarrow MgKPO_4 \cdot 6H_2O$. These materials were developed by Argon National Labs., in Chicago, Ill., and may be available from Argon National Labs. under the tradename "CERAMICRETE." Other examples of suitable particulate bridging agents include compounds described by these formulae:

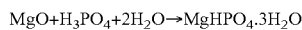
$MgO + H_3PO_4 + 2H_2O \rightarrow MgHPO_4 \cdot 3H_2O$

$MgO + NH_4H_2PO_4 + 5H_2O \rightarrow MgNH_4PO_4 \cdot 6H_2O$

Examples of ceramic particulate bridging agents that are described by these formulae are Newberyite, and Struvite, respectively. The ceramic particulate bridging agent utilized in the treatment fluids of the present invention are generally included therein in an amount of from about 5% to about 60% by weight of the base fluid component, more preferably in the range of from about 7% to about 20%, and most preferably at around 10%.

The particle size distribution of the ceramic particulate bridging agents may be varied depending on the openings to which the bridging agents will be introduced. Generally speaking, the particle size distribution of the bridging agents must be sufficient to bridge across and seal the desired opening downhole. For example, if the pore throats (i.e., very small openings) on a portion of a subterranean formation are to be bridged, then it would be beneficial to use smaller ceramic particulate bridging agents. A suitable size range for this type of application would range from about 0.1 microns to about 200 microns. In other applications, larger bridging agent particulates will be appropriate, for example, when bridging on a gravel pack. Suitable size ranges for such applications include about 1 micron to about 1 millimeter. In other applications, the particle size range may be from about 5 microns to about 8 millimeters. This range may be preferred when, for example, the operation involves sealing on perforations or other openings, such as objects having a plurality of holes.

In certain preferred embodiments, the ceramic particulate bridging agents of the present invention are impregnated with, coated with, or otherwise incorporate a desirable additive. Such desirable additives include but are not limited to polymer breakers, scale inhibitors, weighting agents, paraffin inhibitors, and the like. In one embodiment of the present invention, a breaker is added to the ceramic mixture as the mixture is being formed into particulate bridging agents. When it is desirable to remove them, these breakers are released and, inter alia, may reduce the viscosity of a viscosified treatment fluid or break starch or xanthan in a filter cake. One of ordinary skill in the art with the benefit of this disclosure may recognize other additives that may be beneficially employed with the particulate bridging agents for a given application.

The modified starch compositions of the present invention provide enhanced fluid loss control when used in conjunction with ceramic bridging agents and preferably comprise modified starches. Generally, these starches may be a crosslinked ether derivative of a partially depolymerized starch and/or a partially depolymerized crosslinked ether derivative of a starch. In the former case, the starch is partially depolymerized prior to crosslinking and derivatizing the starch, whereas in the latter case the starch is first crosslinked and derivatized prior to partially depolymerizing the starch derivative. In either case, the molecular weight of the crosslinked starch derivative is decreased by the partial depolymerization of the starch polymer. As used herein, the terms "partially depolymerized starch derivative" and "hydrolyzed starch derivative" are intended to mean the starch derivatives prepared by either method.

In certain embodiments where a crosslinked ether derivative of a partially depolymerized starch is used, it is preferred that the starch be hydrolyzed or depolymerized to the extent that the viscosity of an aqueous dispersion of the starch is reduced about 25% to about 92%, preferably about 50% to about 90%, prior to crosslinking and derivatizing the starch. In the second case, i.e., a partially depolymerized crosslinked ether derivative of a starch, it is preferred that the crosslinked derivative starch by hydrolyzed or depolymerized to the extent that the viscosity of the water dispersion of the starch derivative at a concentration of about 60 kg/m³ is reduced by about 15% to about 50%, preferably 20% to about 40%. An example of a suitable starch is BROMA FLA™, commercially available from TBC Brinadd of Houston, Tex.

In some embodiments, the modified starch composition is included within the treatment fluid compositions of the present invention in a range of from about 0.1% to about 3% by weight of the base fluid component, more preferably in a range of from about 1% to about 1.5%, and most preferably about 1.3% of the base fluid component.

A variety of viscosifiers are suitable for use in conjunction with the present invention. These include, but are not limited to, biopolymers such as xanthan and succinoglycan, cellulose derivatives such as hydroxyethylcellulose, and guar and its derivatives such as hydroxypropyl guar. One of ordinary skill in the art with the benefit of this disclosure will recognize other suitable viscosifiers that may be used in conjunction with the present invention. Xanthan is preferred. The viscosifier is generally included in the treatment fluid compositions of the present invention in an amount ranging from about 0% to 1.0% by weight of the base fluid component. In certain preferred embodiments, the viscosifier is included in the composition in an amount ranging from about 0.13% to about 0.16%. One of ordinary skill in the art with the benefit of this disclosure will be able to determine the appropriate amount of viscosifier needed for a given application.

The base fluid component of the treatment fluid compositions of the present invention preferably comprises an aqueous component. Suitable examples include water, brine, salt water, and the like. Oil-based fluids generally are not the most suitable base fluids for these compositions because they may negatively affect the performance of the starch.

In certain embodiments when the present invention is used in a subterranean application, once the drilling or servicing operation has been completed, a clean-up solution comprising water and a solubilizing agent is introduced into the wellbore whereby the ceramic particulate bridging agents in the filter cake are dissolved. Suitable solubilizing agents include ammonium salts and chelating agents. Suitable ammonium salts include ammonium salts have the following formula:

$R_n NH_{4-n} X$ wherein R is an alkyl group having from 1 to 6 carbon atoms, n is an integer from 0 to 3 and X is an anionic radical, for example, halogens, nitrates, citrates, acetates, sulfates, phosphates, and hydrogen sulfates. Examples of suitable such ammonium salts include but are not limited to ammonium chloride, ammonium bromide, ammonium nitrate, ammonium citrate, ammonium acetate, and mixtures thereof. Of these, ammonium chloride is preferred. The ammonium salt is usually included in the clean-up solution in an amount ranging from about 3% to about 25% by weight of the water therein, more preferably in the range of from about 5% to about 14% and most preferably about 5%. As for chelating agents, the term "chelating agent" as used herein is used to mean a chemical that will form a water-soluble complex with the cationic portion of the bridging agent to be dissolved. Various chelating agents can be utilized including but not limited to ethylenediaminetetraacetic acid and salts thereof, diaminocyclohexanetetraacetic acid and salts thereof, diglycolic acid and salts thereof, citric acid and salts thereof, nitroilotriacetic acid and salts thereof, phosphonic acid and salts thereof, and aspartic acid and salts thereof. Of these, citric acid is preferred. The chelating agent utilized is generally included in the clean-up solution in an amount in the range of from about 0.1% to about 40% by weight of the solution, more preferably in the range of from about 5% to about 20%, and most preferably around 20%. Optionally, the clean-up solution may include one or more oxidizers or other breakers for oxidizing and breaking up various components of the filter cake when desired.

After the drilling or servicing of the producing formation has been completed, the clean-up solution is introduced into the producing formation into contact with the filter cake deposited therein. The clean-up solution is allowed to remain in contact with the filter cake for a period of time sufficient for desired components in the filter cake to be broken up and the bridging agents to be dissolved. The time with which the solubilizing component of the clean-up solution dissolves the components in the filter cake may vary. For example, this interaction could intentionally be a delayed interaction such that the degradation of the filter cake is delayed. A delayed break of the filter cake can be achieved by utilizing a chelating agent such as sodium diglycolate that does not dissolve the bridging agents out of the presence of the ammonium salt or salts. The ammonium salts can be delivered in a form designed to release them after a chosen time delay. At that release point, the chelating agent will act to begin to degrade the bridging agents in the filter cake. In other embodiments, the interaction may be immediate. If desired, a wash solution can be used to removing any remaining filter cake.

An embodiment of the present invention provides a method of providing fluid loss control through an opening from a first location to a second location comprising the steps of: providing a treatment fluid comprising ceramic particulate bridging agents, a modified starch composition, and a base fluid; introducing the treatment fluid to the first location; and allowing the treatment fluid to form a filter cake to prevent fluid loss from the first location to the second location.

EXAMPLES

Table 1 shown below is the drill-in fluid mud recipe using Newberyite and a commonly used starch. The starch used in this recipe was a starch known as "N-DRIL HT PLUS," which is a commonly used starch available from Halliburton Energy Services in various locations. N-DRIL HT PLUS is a stabilized nonionic starch derivative (waxy maize) that seeks to control high pressure, high temperature filtrate loss. In combination with other polymers such as xanthan, N-DRIL HT PLUS is synergistic and yields improved suspension. However, when used in combination with ceramic bridging agents, the combination will form a poor filter cake and will become a thick gel.

TABLE 1

| Component | Amount |
|---|---|
| 10% NaCl | 336 ml |
| Xanthan | 0.85 g |
| N-DRIL HT PLUS | 7.4 g |
| Newberyite | 25.0 g |
| NaOH | 0.1 g |

The composition of Table 1 formed a thick gel that was not usable in subterranean applications.

Table 2 shown below is the drill-in fluid mud recipe using Newberyite and a modified starch as those starches are described herein. This composition forms a tight filter cake, and does not form an unusable thick gel, even over a 24 to 48 hour period. The starch used in this recipe is BROMA FLA™, which is commercially available from TBC Brinadd of Houston, Tex.

TABLE 2

| Component | Amount |
| --- | --- |
| Water | 317 ml |
| NaCl | 90.4 g |
| BROMA FLA ™ | 5.0 g |
| Xanthan | 1.25 g |
| Newberyite | 25.0 g |

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A fluid loss treatment fluid comprising:
    ceramic particulate bridging agents, wherein at least one of the ceramic particulate bridging agents comprises one of the following: newberyite or struvite,
    a partially depolymerized starch derivative, and
    a base fluid.

2. The composition of claim 1 wherein the fluid loss treatment fluid is a component of a drilling fluid, a drill-in fluid, or a fluid loss control pill.

3. The composition of claim 1 wherein the treatment fluid further comprises an additive wherein the additive is a viscosifier, a salt, a surfactant, a clay control additive, a lubricant, or a biocide.

4. The composition of claim 1 wherein the ceramic particulate bridging agents comprise a magnesium compound.

5. The composition of claim 1 wherein the ceramic particulate bridging agents are included in the treatment fluid in an amount ranging from about 5% to about 60% based on the weight of the base fluid.

6. The composition of claim 1 wherein the ceramic particulate bridging agents have a particle size distribution ranging from about 0.1 microns to about 200 microns.

7. The composition of claim 1 wherein the ceramic particulate bridging agents have a particle size distribution ranging from about 1 micron to about 1 millimeter.

8. The composition of claim 1 wherein the ceramic particulate bridging agents have a particle size distribution ranging from about 5 microns to about 8 millimeters.

9. The composition of claim 1 wherein at least a portion of the ceramic particulate bridging agents comprise an additive chosen from the group consisting of a breaker, a scale inhibitor, a weighting agent, and a paraffin inhibitor.

10. The composition of claim 1 wherein the partially depolymerized starch derivative is a crosslinked ether derivative of a partially depolymerized starch.

11. The composition of claim 1 wherein the partially depolymerized starch derivative is included in the treatment fluid in an amount ranging from about 0.1% to about 3% by weight of the base fluid.

12. The composition of claim 1 wherein the treatment fluid comprises a viscosifier that comprises a polysaccharide.

13. The composition of claim 12 wherein the viscosifier is included in the treatment fluid in an amount ranging from about 0.1% to about 1.0% by weight of the base fluid.

14. The composition of claim 1 wherein the partially depolymerized starch derivative is a partially depolymerized crosslinked ether derivative of a starch.

15. The composition of claim 14 wherein the partially depolymerized crosslinked ether derivative of a starch is included in the treatment fluid in an amount ranging from about 0.1% to about 3% by weight of the base fluid.

16. The composition of claim 14 wherein the treatment fluid comprises a viscosifier that comprises a polysaccharide.

17. The composition of claim 16 wherein the viscosifier is included in the treatment fluid in an amount ranging from about 0.1% to about 1.0% by weight of the base fluid.

18. The composition of claim 1 wherein the partially depolymerized starch derivative comprises a crosslinked ether derivative of a partially depolymerized starch and a partially depolymerized crosslinked ether derivative of a starch.

* * * * *